(12) United States Patent
Chen

(10) Patent No.: US 10,764,415 B2
(45) Date of Patent: Sep. 1, 2020

(54) SCREEN LIGHTING METHOD FOR DUAL-SCREEN TERMINAL AND TERMINAL

(71) Applicant: HUAWEI TECHNOLOGIES CO., LTD., Shenzhen (CN)

(72) Inventor: Yong Chen, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/344,867

(22) PCT Filed: Dec. 20, 2016

(86) PCT No.: PCT/CN2016/111029
§ 371 (c)(1),
(2) Date: Apr. 25, 2019

(87) PCT Pub. No.: WO2018/076506
PCT Pub. Date: May 3, 2018

(65) Prior Publication Data
US 2020/0059543 A1    Feb. 20, 2020

(30) Foreign Application Priority Data
Oct. 25, 2016    (CN) .......................... 2016 1 0940986

(51) Int. Cl.
*H04M 1/00* (2006.01)
*H04M 1/02* (2006.01)
(Continued)

(52) U.S. Cl.
CPC ........ *H04M 1/0266* (2013.01); *G06F 1/1647* (2013.01); *G06F 3/0488* (2013.01);
(Continued)

(58) Field of Classification Search
CPC ............ H04M 1/0266; H04M 1/0214; H04M 2250/12; H04M 2250/16; H04M 2250/22; G06F 1/1647; G06F 3/0488
See application file for complete search history.

(56) References Cited

U.S. PATENT DOCUMENTS

| 2009/0153495 A1* | 6/2009 | Chen .................. G06F 3/04847 345/173 |
| 2013/0249873 A1 | 9/2013 | Zhang et al. |

(Continued)

FOREIGN PATENT DOCUMENTS

| CN | 102214442 A | 10/2011 |
| CN | 203193697 U | 9/2013 |

(Continued)

*Primary Examiner* — Tuan Pham
(74) *Attorney, Agent, or Firm* — Kilpatrick Townsend & Stockton LLP

(57) ABSTRACT

The present invention discloses a screen lighting method for a dual-screen terminal and a terminal. In this method, after detecting an operation performed by a user to trigger lighting of a screen, the terminal detects a quantity of touch regions on a first screen of the terminal and a quantity of touch regions on a second screen of the terminal, and the terminal lights a screen with a smaller quantity of touch regions. By analyzing a gesture of handholding the terminal by the user, a generality between a touch status of a screen that the user expects the terminal to light and a touch status of a currently unused screen is found. Therefore, the screen that the user expects the terminal to light can be determined relatively accurately based on the touch statuses of the two screens.

10 Claims, 10 Drawing Sheets

(51) Int. Cl.
*G06F 1/16* (2006.01)
*G06F 3/0488* (2013.01)

(52) U.S. Cl.
CPC ...... *H04M 1/0214* (2013.01); *H04M 2250/12* (2013.01); *H04M 2250/16* (2013.01); *H04M 2250/22* (2013.01); *H04M 2250/52* (2013.01)

(56) References Cited

U.S. PATENT DOCUMENTS

| | | |
|---|---|---|
| 2015/0024728 A1 | 1/2015 | Jang |
| 2017/0019587 A1* | 1/2017 | Matas ................ H04N 1/00458 |
| 2017/0272654 A1* | 9/2017 | Poindexter, Jr. ... H04N 5/23216 |

FOREIGN PATENT DOCUMENTS

| | | |
|---|---|---|
| CN | 203276125 U | 11/2013 |
| CN | 103472906 A | 12/2013 |
| CN | 105912286 A | 8/2016 |
| CN | 106027795 A | 10/2016 |

\* cited by examiner

SCREEN LIGHTING METHOD FOR DUAL-SCREEN TERMINAL AND TERMINAL

CROSS-REFERENCE TO RELATED APPLICATIONS

This application is a national stage of International Application No. PCT/CN2016/111029, filed on Dec. 20, 2016, which claims priority to Chinese Patent Application No. 201610940986.X, filed on Oct. 25, 2016. Both of the aforementioned applications are hereby incorporated by reference in their entireties.

TECHNICAL FIELD

The present invention relates to the field of terminal technologies, and in particular, to a screen lighting method for a dual-screen terminal and a terminal.

BACKGROUND

Currently, dual-screen smartphones draw increasing attention. There are mainly two types of dual-screen mobile phones:

One type is a clamshell dual-screen mobile phone shown in FIG. 1, and screens are respectively disposed on the inside and the outside of a clamshell part. When the clamshell part is closed, a screen on the outside is lighted if a user triggers a screen lighting operation; or when the clamshell part is open, a screen on the inside is lighted.

The other type is a bar dual-screen mobile phone shown in FIG. 2, and screens are respectively disposed on a front side and a back side of the mobile phone. Usually, a color screen is disposed on the front side of the mobile phone, and a color screen or an ink screen, usually the ink screen, is disposed on the back side of the mobile phone.

In the bar dual-screen mobile phone, a switching button that can be tapped by a user is provided in a mobile phone interface to perform a switching operation between two screens. When a front screen of the mobile phone is in a screen-on state, a switching button on the front screen is tapped to switch to a back screen, so that the back screen is in the screen-on state for use; and the front screen is turned off to save power. When a back screen of the mobile phone is in a screen-on state, a switching button on the back screen is tapped to switch to a front screen, so that the front screen is in the screen-on state for use; and the back screen may be turned off, or may not be turned off. If the back screen is not turned off, no event can be triggered by touching the back screen.

For the bar dual-screen mobile phone, when both screens are in a screen-off state, when the user triggers lighting of a screen through a specific operation (for example, pressing a power button, pressing a Home button or a voice control button, or another operation), the user may detect a screen in an upward direction by using an acceleration sensor (or referred to as a gravity sensor) in the mobile phone. As shown in FIG. 3(a), a front color screen is lighted if it is detected that the front color screen is in the upward direction. As shown in FIG. 3(b), a back ink screen is lighted if it is detected that the back ink screen is in the upward direction.

However, in some special scenarios, for example, when the user lies on a back or a side of the user, it is determined based on a detection result of the acceleration sensor that a lighted screen is not a screen that the user expects the mobile phone to light. The user needs to perform a plurality of operations by using the switching button, to light the screen that the user expects the mobile phone to light. Consequently, user experience is relatively poor.

SUMMARY

Embodiments of the present invention provide a screen lighting method for a dual-screen terminal and a terminal, so that a screen that a user expects a terminal to light is lighted more accurately without adding an operation of the user.

According to a first aspect, an embodiment of the present invention provides a screen lighting method for a dual-screen terminal, including:

after detecting an operation performed by a user to trigger lighting of a screen, detecting, by the terminal, a quantity of touch regions on a first screen of the terminal and a quantity of touch regions on a second screen of the terminal; and lighting, by the terminal, a screen with a smaller quantity of touch regions.

After a gesture of using the terminal by the user is analyzed, it is found that the user usually uses a relatively small quantity of fingers to touch and control a screen facing the user, to be specific, a screen that the user expects the terminal to light has a relatively small quantity of touch regions; and uses a relatively large quantity of fingers on a side backing to the user to support the terminal, to be specific, a screen backing to the user has a relatively large quantity of touch regions. Therefore, the screen that the user expects the terminal to light can be usually determined based on only the quantity of touch regions on the first screen and the quantity of touch regions on the second screen.

With reference to the first aspect, in a first possible implementation of the first aspect, when the quantity of touch regions on the first screen is equal to the quantity of touch regions on the second screen, the terminal may further detect a quantity of channels covered by a touch region on the first screen and a quantity of channels covered by a touch region on the second screen; and the terminal may light a screen on which a touch region covers a smaller quantity of channels, where the channels are sensing channels that are disposed in both horizontal and vertical directions of the first screen and the second screen.

Because of some special gestures of handholding the terminal, a case in which the quantity of touch regions on the first screen is equal to the quantity of touch regions on the second screen may occur. However, usually, a touch area of a screen facing the user is relatively small, and a touch area of a screen backing to the user is relatively large. However, a size of a touch area may be indicated by using a quantity of channels covered by a touch region. A larger quantity of covered channels indicates a larger touch area, and a smaller quantity of covered channels indicates a smaller touch area. Therefore, the terminal may determine a to-be-lighted screen based on a quantity of channels covered by a touch region.

Certainly, the terminal may further determine the to-be-lighted screen based on an area of a touch region on the first screen and an area of a touch region on the second screen. After detecting the operation performed by the user to trigger lighting of a screen, the terminal may first determine a quantity of touch regions. If the quantity of touch regions on the first screen is different from the quantity of touch regions on the second screen, the screen with the smaller quantity of touch regions is lighted because a process of determining a quantity of touch regions is relatively simple and fast. If the quantity of touch regions on the first screen is equal to the quantity of touch regions on the second screen, the touch area of the first screen and the touch area of the second screen are further calculated, and a screen with a smaller touch area is lighted. Certainly, after detecting the operation performed by the user to trigger lighting of a screen, the terminal may directly determine a to-be-lighted screen based on a touch area.

With reference the first aspect, in a second possible implementation of the first aspect, when the quantity of touch regions on the first screen is equal to the quantity of touch regions on the second screen, the terminal may further detect a length of a major axis of an oval that fits the touch region on the first screen and a length of a major axis of an oval that fits the touch region on the second screen, and light a screen with a smaller length of a major axis.

After detecting that a screen is touched, the terminal may analyze a touch region, and obtain a major axis and a minor axis of the touch region. Usually, a touch region is small when the user touches and controls a screen, and correspondingly, a major axis of the touch region is relatively small. However, a touch region on a screen backing to the user is relatively large, and correspondingly, a major axis of the touch region is relatively large. Therefore, the terminal may determine a to-be-lighted screen based on a length of a major axis of a touch region.

With reference to the first aspect, in a second possible implementation of the first aspect, if neither the first screen nor the second screen is touched, the terminal may further determine a screen in an upward direction by using an acceleration sensor or another sensing apparatus, and light the screen in the upward direction.

For example, the terminal is placed on a table. When the user performs touch control to light a screen of the terminal by slightly pressing a power button or a Home button or by using a voice, no touch region can be detected on both the first screen and the second screen. In this case, the screen in the upward direction is obviously the screen that the user expects the terminal to light.

With reference to the first aspect, in a third possible implementation of the first aspect, if neither the first screen nor the second screen is touched, the terminal may enable a first camera and a second camera. The first camera and the first screen are located on a same side of the terminal, and the second camera and the second screen are located at a same side of the terminal. The terminal determines to light the first screen if the first camera can detect a face; or the terminal lights the second screen if the second camera detects a face.

In some scenarios, the user may pinch two sides of the terminal by using a hand, and trigger lighting of a screen; and a finger or a palm does not touch the first screen or the second screen. In this case, a camera may be enabled, and a screen on a side that can detect a face, namely, a side facing the user may be considered as the screen that the user expects the terminal to light.

Certainly, when there is a relatively large quantity of people, both the first camera and the second camera may be capable of detecting a face. Because the terminal is usually most close to a user operating the terminal, a distance between the terminal and a person on a side of the terminal may be further determined based on a proximity sensor or by analyzing an image collected by a camera, and a screen on a side on which a person is relatively close to the terminal is lighted.

In another possible implementation, the terminal may further set a screen as a default screen. The terminal may light the specified default screen when both the first camera and the second camera detect a face, when neither the first camera nor the second camera detects a face, when the quantity of touch regions on the first screen is equal to the quantity of touch regions on the second screen, or when neither the first screen nor the second screen is touched, or in another case.

According to a second aspect, an embodiment of the present invention provides a screen lighting method for a dual-screen terminal, including:

after detecting an operation performed by a user to trigger lighting of a screen, enabling, by the terminal, a first camera and a second camera, where the first camera and a first screen are located on a same side of the terminal, and the second camera and a second screen are located on a same side of the terminal; lighting, by the terminal, the first screen if the first camera detects a face; or lighting, by the terminal, the second screen if the second camera detects a face.

Usually, when the user triggers lighting of a screen of the terminal, the user faces the terminal. When the user faces the terminal, a face of the user can usually be identified by a camera on a side facing the user. Therefore, a camera may be enabled. A screen on a side that can detect a face, namely, a side facing the user may be considered as a screen that the user expects the terminal to light.

With reference to the second aspect, in a first possible implementation of the second aspect, if neither the first camera nor the second camera detects a face, the terminal may further determine a screen in an upward direction by using a gravity sensor or another sensing apparatus, and light the screen in the upward direction.

In some cases, neither the first camera nor the second camera can detect a face. For example, the terminal is placed on a table, and the user may want to know only a time by using the terminal, instead of continuing to perform another operation by using the terminal. In this case, the user only needs to approach to the terminal to clearly see a time on the screen, and does not need to face the screen. In this case, the screen in the upward direction may be determined by using the sensing apparatus, and the screen in the upward direction is considered as the screen that the user expects the terminal to light.

With reference to the second aspect, in a second possible implementation of the second aspect, if neither the first camera nor the second camera detects a face, or both the first camera and the second camera detect a face, the terminal may continue to detect a touch status of the first screen and a touch status of the second screen, and determine whether to light the first screen or the second screen.

Usually, when the user operates the terminal, a relatively small quantity of fingers are used to touch and control a screen facing the user, and a touch area is relatively small. However, a plurality of fingers support a screen backing to the user. Therefore, the terminal may determine a to-be-lighted screen based on the touch status of the first screen and the touch status of the second screen. For example, the terminal may determine a screen with a smaller quantity of touch regions as a screen that needs to be lighted. Alternatively, the terminal may determine, as a screen that needs to be lighted, a screen on which a touch region covers a smaller quantity of channels. Alternatively, the terminal may light a screen with a smaller length of a major axis of a touch region. Alternatively, the terminal may determine, as a screen that needs to be lighted, a screen on which a touch region has a smaller area.

In another possible implementation, the terminal may further set a screen as a default screen. The terminal may light a specified default screen when both the first camera and the second camera detect a face, when neither the first camera nor the second camera detects a face, when a quantity of touch regions on the first screen is equal to a quantity of touch regions on the second screen, or when neither the first screen nor the second screen is touched, or in another case.

According to a third aspect, an embodiment of the present invention provides a method for turning off a screen. The method may be applied to a terminal including a foldable screen. When the screen is unfolded, the screen is relatively large. When the screen is folded, the screen becomes two relatively small screens that are separately referred to as a first screen and a second screen. The method specifically includes:

when detecting that the foldable screen is folded, the terminal detects a quantity of touch regions on the first screen and a quantity of touch regions on the second screen, and the terminal turns off a screen with a larger quantity of touch regions.

After a user folds a larger screen into two screens, the user usually performs an operation on only one screen. In this case, the terminal may automatically turn off the other screen backing to the user, to reduce power consumption. However, the user usually uses a relatively small quantity of fingers to touch and control a screen facing the user. To be specific, a screen used by the user has a relatively small quantity of touch regions. Therefore, the terminal may turn off a screen with a relatively large quantity of touch regions.

With reference to the third aspect, in a first possible implementation of the third aspect, when the quantity of touch regions on the first screen is equal to the quantity of touch regions on the second screen, the terminal may detect a quantity of channels covered by a touch region on the first screen and a quantity of channels covered by a touch region on the second screen, and the terminal may turn off a screen on which a touch region covers a larger quantity of channels. The channels are sensing channels that are disposed in both horizontal and vertical directions of the first screen and the second screen. Alternatively, the terminal may detect a length of a major axis of a touch region on the first screen and a length of a major axis of a touch region on the second screen, and light a screen with a smaller length of a major axis of a touch region.

Certainly, the terminal may further determine a screen in a downward direction based on a gravity sensor or another sensing apparatus, and turn off the screen in the downward direction.

According to a fourth aspect, an embodiment of the present invention provides a dual-screen terminal, including: a first screen, a second screen, a processor, and a memory and a detector that are separately connected to the processor.

The processor is configured to invoke a computer program prestored in the memory, to perform the following operations:

detecting a quantity of touch regions on the first screen and a quantity of touch regions on the second screen by using the detector; and lighting a screen with a smaller quantity of touch regions if the quantity of touch regions on the first screen is different from the quantity of touch regions on the second screen.

With reference to the fourth aspect, in a first possible implementation of the fourth aspect, sensing channels are disposed in both horizontal and vertical directions of the first screen and the second screen, and the processor is further configured to:

if the quantity of touch regions on the first screen is equal to the quantity of touch regions on the second screen, detect, by using the detector, a quantity of channels covered by a touch region on the first screen and a quantity of channels covered by a touch region on the second screen; and light a screen on which a touch region covers a smaller quantity of channels.

With reference to the fourth aspect, in a second possible implementation of the fourth aspect, the processor is further configured to:

detect, by using the detector, a length of a major axis of a touch region on the first screen and a length of a major axis of a touch region on the second screen if the quantity of touch regions on the first screen is equal to the quantity of touch regions on the second screen; and light a screen with a smaller length of a major axis of a touch region.

With reference to the fourth aspect, in a third possible implementation of the fourth aspect, the processor is further configured to: determine a screen in an upward direction if neither the first screen nor the second screen is touched; and light the screen in the upward direction.

With reference to the fourth aspect, in a fourth possible implementation of the fourth aspect, the processor is further configured to: enable a first camera and a second camera if neither the first screen nor the second screen is touched, where the first camera and the first screen are located on a same side of the terminal, and the second camera and the second screen are located on a same side of the terminal; and light the first screen if the first camera detects a face; or light the second screen if the second camera detects a face.

According to a fifth aspect, an embodiment of the present invention provides a dual-screen terminal, including: a first screen, a second screen, a first camera, a second camera, a processor, and a memory connected to the processor, where the first camera and the first screen are located on a same side of the terminal, and the second camera and the second screen are located on a same side of the terminal; and the processor is configured to invoke a computer program prestored in the memory, to perform the following operations:

enabling the first camera and the second camera; and lighting the first screen if the first camera detects a face; or lighting the second screen if the second camera detects a face.

With reference to the fifth aspect, in a first possible implementation of the fifth aspect, if neither the first camera nor the second camera detects a face, the processor is further configured to: determine a screen in an upward direction; and light the screen in the upward direction.

With reference to the fifth aspect, in a second possible implementation of the fifth aspect, if neither the first camera nor the second camera detects a face, or both the first camera and the second camera detect a face, the processor is further configured to: detect a touch status of the first screen and a touch status of the second screen; and determine, based on the detected touch statuses, whether to light the first screen or the second screen.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

To make the objectives, technical solutions, and advantages of the present invention clearer, the following further describes the present invention in detail with reference to the accompanying drawings.

In the prior art, for a dual-screen terminal, when a user performs an operation of triggering lighting of a screen, the terminal cannot accurately determine a screen that the user expects the terminal to light. The user may further need to perform a screen switching operation, and consequently, user experience is relatively poor.

To resolve the foregoing problem, embodiments of the present invention provide a screen lighting method for a dual-screen terminal, so that a screen that the user expects the terminal to light can be determined more accurately regardless of a posture of the user.

The terminal related in the embodiments of the present invention may include a mobile phone, a tablet computer, a personal digital assistant (Personal Digital Assistant, PDA), or the like.

Figure 5:
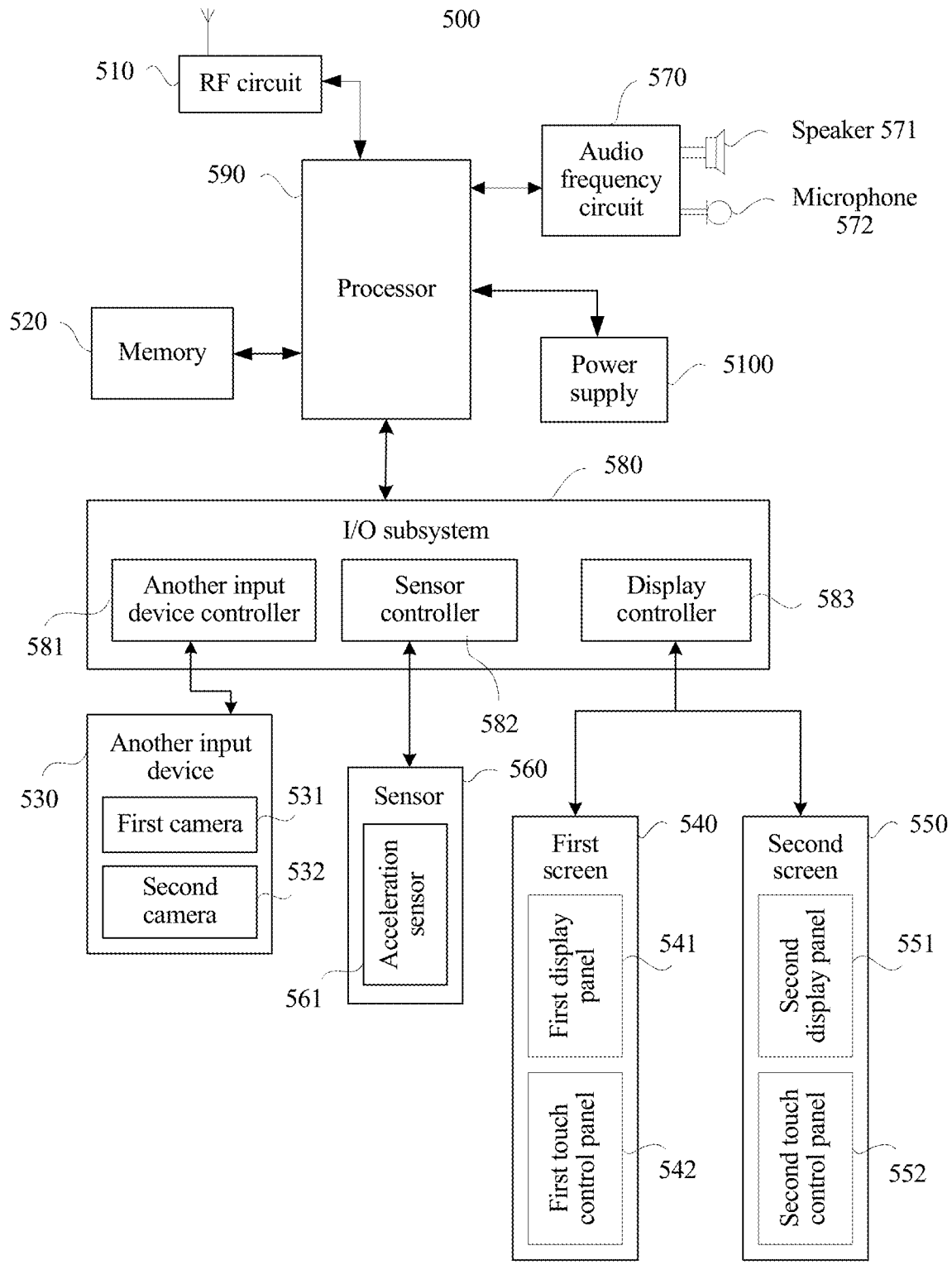
FIG. 5 is a schematic structural diagram of a terminal that may be applied to an embodiment of the present invention.

For example, the terminal is a mobile phone. FIG. 5 is a block diagram of a partial structure of a mobile phone 500 according to an embodiment of the present invention. Referring to FIG. 5, the mobile phone 500 includes components such as an RF (Radio Frequency, radio frequency) circuit 510, a memory 520, another input device 530, a first screen 540, a second screen 550, a sensor 560, an audio frequency circuit 570, an I/O subsystem 580, a processor 590, and a power supply 5100. Persons skilled in the art may understand that the structure of the mobile phone shown in FIG. 5 imposes no limitation on the mobile phone. The mobile phone may include more or fewer components than those shown in the figure, may combine some components, may split some components, or may have different component deployments.

The following describes each constituent component of the mobile phone 500 in detail with reference to FIG. 5.

The RF circuit 510 may be configured to: receive and send information, or receive and send a signal in a call process; particularly, after receiving downlink information of a base station, send the downlink information to the processor 590 for processing; and in addition, send designed uplink data to the base station. Generally, the RF circuit includes but is not limited to an antenna, at least one amplifier, a transceiver, a coupler, an LNA (Low Noise Amplifier, low noise amplifier), and a duplexer. In addition, the RF circuit 510 may further communicate with a network and another device through radio communications. The radio communications may use any communications standard or protocol, including but not limited to GSM (Global System of Mobile communication, Global System for Mobile Communications), a GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), an e-mail, an SMS (Short Messaging Service, short message service), and the like.

The memory 520 may be configured to store a software program and a module. The processor 590 runs the software program and the module that are stored in the memory 520, to perform various function applications and data processing of the mobile phone 500. The memory 520 may mainly include a program storage area and a data storage area. The program storage area may store an operating system, an application program required by at least one function (such as a voice playing function or an image displaying function), and the like. The data storage area may store data (such as audio data or a phone book) created based on use of the mobile phone 500, and the like. In addition, the memory 520 may include a high-speed random access memory; or may include a nonvolatile memory, for example, at least one magnetic disk storage component, a flash memory component, or another volatile solid-state storage component.

The another input unit 530 may be configured to: receive input digit or character information, and generate key signal input related to a user setting and function control of the mobile phone 500. Specifically, the another input device 530 may include but is not limited to one or more of a physical keyboard, a function key (such as a volume control key or an on/off key), a joystick, and the like. In some embodiments of the present invention, the another input device may further include a first camera 531 and a second camera 532, configured to collect an image. The another input device 530 is connected to another input device controller 581 in the I/O subsystem 580, and exchanges a signal with the processor 590 under control of the another input device controller 581.

The first screen 540 and the second screen 550 may be configured to display information input by the user or information provided for the user, and various menus of the mobile phone 500, and may further accept user input. Specifically, the first screen 540 may include a first display panel 541 and a first touch control panel 542. The first display panel 541 may be configured in a form of an LCD (Liquid Crystal Display, liquid crystal display), an OLED (Organic Light-Emitting Diode, organic light-emitting diode), or the like. The first touch control panel 542 is also referred to as a touchscreen, a touch-sensitive screen, or the like. The first touch control panel 542 may collect a touch or non-touch operation (for example, an operation performed by the user on or near the first touch control panel 542 by using any proper object or accessory such as a finger or a stylus; or a motion sensing operation, where the operation includes an operation type such as a single-point control operation or a multipoint control operation) of the user on or near the first touch control panel 542, and drive a corresponding connection apparatus based on a preset program. Optionally, the first touch control panel 542 may include two parts: a touch detection apparatus and a touch controller. The touch detection apparatus detects a touch orientation and a gesture of the user, detects a signal brought by a touch operation, and sends the signal to the touch controller. The touch controller receives touch information from the touch detection apparatus, converts the touch information into information that can be processed by the processor, and then sends the information to the processor 590. The touch controller can receive and execute a command sent by the processor 590. In addition, the first touch control panel 542 may be implemented by using a plurality of types such as a resistive type, a capacitive type, an infrared ray, and a surface acoustic wave, or may be implemented by using any technology developed in the future. Further, the first touch control panel 542 may cover the first display panel 541. The user may perform, based on content displayed on the first display panel 541 (the displayed content includes but is not limited to a soft keyboard, a virtual mouse, a virtual key, an icon, or the like), an operation on or near the first touch control panel 542 that covers the first display panel 541. After detecting the operation on or near the first touch control panel 542, the first touch control panel 542 sends the operation to the processor 590 by using the I/O subsystem 580 to determine user input. Then, the processor 590 provides, based on the user input, corresponding visual output on the first display panel 541 by using the I/O subsystem 580. In FIG. 5, the first touch control panel 542 and the first display panel 541 are used as two independent components to implement input and input functions of the mobile phone 500. However, in some embodiments, the first touch control panel 542 and the first display panel 541 may be integrated to implement the input and output functions of the mobile phone 500. The second screen 550 and the first screen 540 may be mutually independent screens, or may be two screens formed after one foldable screen is folded. When the second screen 550 and the first screen 540 are mutually independent screens, a second display panel 551 of the second screen may be the same as the first display panel 541. The second display panel 551 configured by using an LED or an OLED may also be configured by using an ink screen. However, another structure, connection, function, and the like of the second screen 550 are similar to those of the first screen 540. Details are not described herein again.

The mobile phone 500 may further include at least one type of sensor 560, such as an acceleration sensor 561, a light sensor, or another sensor. Specifically, the acceleration sensor 561 may detect an acceleration value in each direction (usually in three axes), and detect a value and a direction of gravity when the acceleration sensor 561 is static; and may be used in an application to identify a mobile phone posture (such as screen switching between a landscape mode and a portrait mode, a related game, or magnetometer posture calibration), a function related to vibration identification (such as a pedometer or a knock), and the like. The light sensor may include an ambient light sensor and a proximity sensor. The ambient light sensor may adjust luminance of the first screen 540 or the second screen 550 based on brightness of ambient light, and the proximity sensor may turn off a screen and/or backlight when the mobile phone 500 approaches an ear. Other sensors such as a gyroscope, a barometer, a hygrometer, a thermometer, and an infrared sensor may be further configured on the mobile phone 500. Details are not described herein.

The audio frequency circuit 570, a speaker 571, and a microphone 572 may provide an audio interface between the user and the mobile phone 500. The audio frequency circuit 570 may transmit, to the speaker 571, a received signal obtained after audio data conversion, and the speaker 571 converts the signal into a sound signal for output. Further, the microphone 572 converts a collected sound signal into a signal; and the audio frequency circuit 570 receives the signal, converts the signal into audio data, and then outputs the audio data to the RF circuit 510, so as to send the audio data to, for example, another mobile phone, or outputs the audio data to the memory 520 for further processing.

The I/O subsystem 580 is configured to control an external input/output device, and may include the another input device controller 581, a sensor controller 582, and a display controller 583. Optionally, one or more other input device controllers 581 receive a signal from the another input device 530 and/or send a signal to the another input device 530. The another input control device 530 may include a physical button (for example, a push button or a rocker button), a dial pad, a slider switch, a camera, or the like. It should be noted that the another input device controller 581 may be connected to any one or more of the foregoing devices. The display controller 583 in the I/O subsystem 580 receives a signal from the first screen 540 (and/or the second screen 550) and/or sends a signal to the first screen 540 (and/or the second screen 550). After the first screen 540 (and/or a second screen 550) detects the user input, the display controller 583 converts the detected user input into interaction with a user interface object displayed on the first screen 540 (and/or the second screen 550), to be specific, implements human-machine interaction. The sensor controller 582 may receive a signal from one or more sensors 560 and/or send a signal to one or more sensors 560.

The processor 590 is a control center of the mobile phone 500, uses various interfaces and lines to connect all parts of the entire mobile phone, and performs various functions and data processing of the mobile phone 500 by running or executing the software program and/or the module stored in the memory 520 and invoking data stored in the memory 520, so as to perform overall monitoring on the mobile phone. Optionally, the processor 590 may include one or more processing units. Preferably, an application processor and a modem processor may be integrated into the processor 590. The application processor mainly processes an operating system, a user interface, an application program, and the like. The modem processor mainly processes radio communications. It may be understood that the modem processor may not be integrated into the processor 590.

The mobile phone 500 further includes the power supply 5100 (such as a battery) that supplies power to the components. Preferably, the power supply may be logically connected to the processor 590 by using a power supply management system, so that functions such as charging, discharging, and power consumption are implemented by using the power supply management system.

Although not shown, the mobile phone 500 may further include another module such as a Bluetooth module. Details are not described herein.

The following describes in detail the method provided in the embodiments of the present invention.

Figure 6:
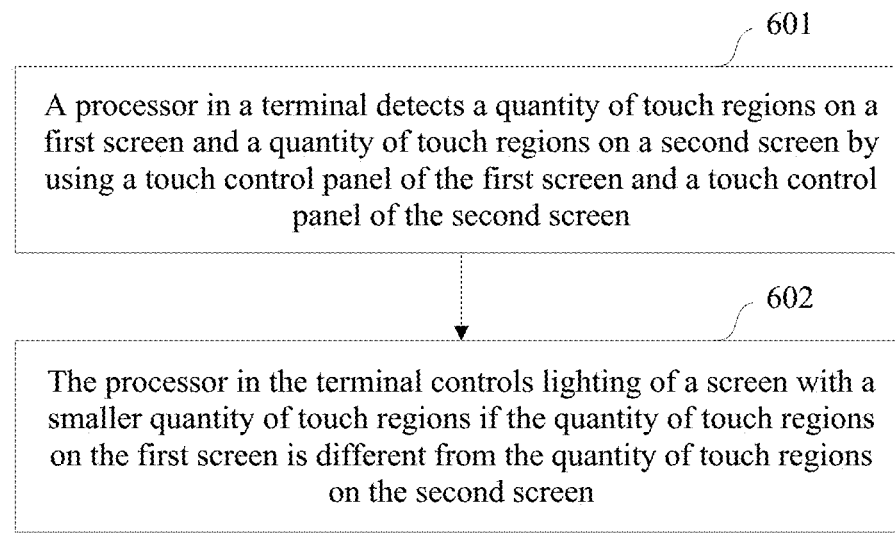
FIG. 6 is a schematic flowchart of a screen lighting method for a dual-screen terminal according to an embodiment of the present invention.

Referring to FIG. 6, FIG. 6 is a schematic flowchart of a screen lighting method for a dual-screen terminal according to an embodiment of the present invention. The method may be applied to a terminal including two independent screens. When both screens are in a screen-off state or in a dimming state, and a user triggers lighting of the terminal, the terminal automatically determines a to-be-lighted screen. As shown in FIG. 6, the method includes the following steps.

Step 601: A processor in the terminal detects a quantity of touch regions on a first screen and a quantity of touch regions on a second screen by using a touch control panel of the first screen and a touch control panel of the second screen.

In some embodiments, the processor in the terminal may detect the quantity of touch regions on the first screen and the quantity of touch regions on the second screen after detecting, by using a detector, an operation performed by a user to trigger lighting of a screen.

The operation performed by the user to trigger lighting of a screen may be pressing a power button or pressing a Home button, or may be controlled by a voice of the user, or may be an operation such as shaking the terminal. Alternatively, the terminal detects operations of the user such as a touch or non-touch operation and identity authentication by using another sensor, a camera, or the like. This is not limited in this embodiment of the present invention.

Because the operation performed by the user to trigger lighting of a screen may be in various forms, there are different corresponding detectors. For example, when the user triggers lighting of a screen by pressing the power button or the Home button, a corresponding detector may be an input device controller; when the user triggers lighting of a screen by shaking the terminal, a corresponding detector may be a sensor controller; or when the user triggers lighting of a screen by using a voice, a corresponding detector may be an audio frequency circuit.

In some other embodiments, the processor in the terminal may immediately detect the quantity of touch regions on the first screen and the quantity of touch regions on the second screen after detecting a touch operation of a user by using a detector.

Figure 7:
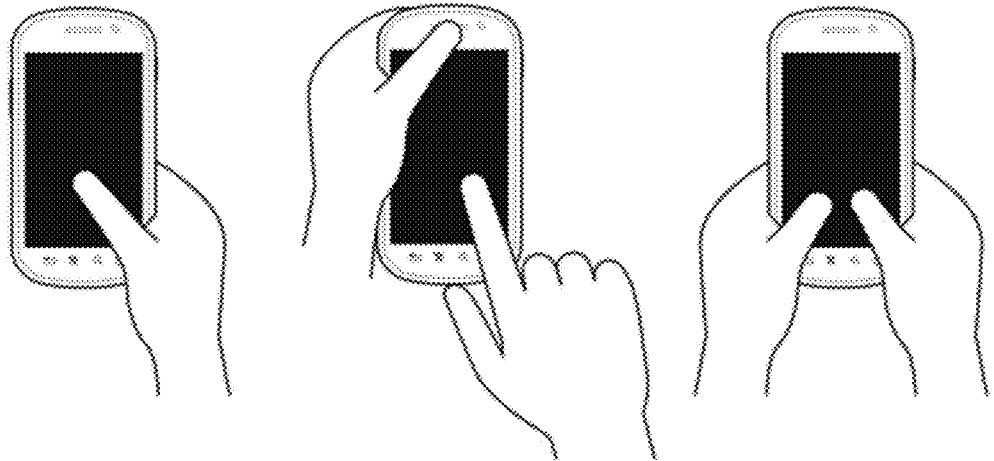
FIG. 7 shows a gesture of handholding a terminal by a user.

After a gesture of handholding the terminal by the user is surveyed and analyzed, it is found that when operating the terminal by using a hand, most users usually use a gesture shown in FIG. 7. It can be learned from the figure that the user usually uses a relatively small quantity of fingers to touch and control a screen used by the user, and places a relatively large quantity of fingers on a side of the terminal backing to the user to support the screen. However, the touch control panel of the screen of the terminal can detect touch of the user relatively precisely, and can still detect a plurality of touch regions even if the user adducts fingers. Therefore, based on a quantity of fingers on the screen, namely, a quantity of touch regions, the processor in the terminal may determine a screen that the user expects the terminal to light.

Step 602: The processor in the terminal controls lighting of a screen with a smaller quantity of touch regions if the quantity of touch regions on the first screen is different from the quantity of touch regions on the second screen.

Figure 8:
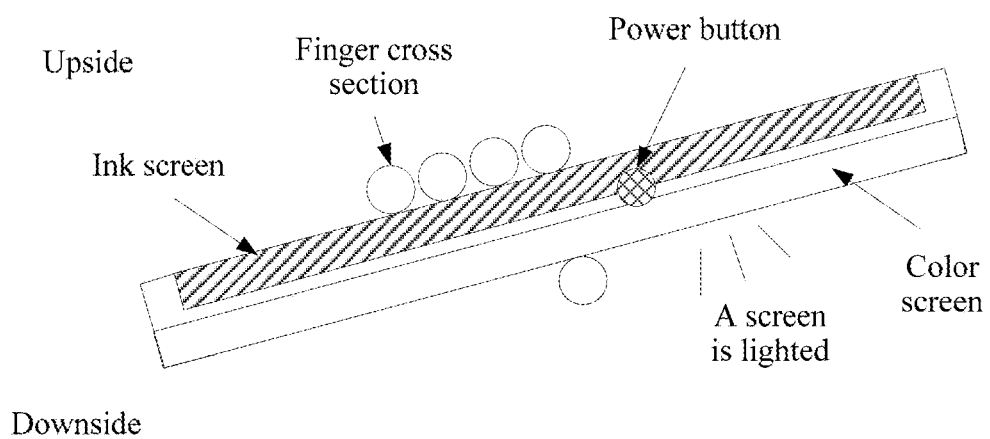
FIG. 8 is a schematic diagram of determining a to-be-lighted screen by using a method according to an embodiment of the present invention.

According to the foregoing embodiment, after the user performs the operation to trigger lighting of a screen, the terminal may determine, based on a touch status of the screen, the screen that the user expects the terminal to light. In comparison with a method for performing determining by using only an acceleration sensor in the prior art, the screen that the user expects the terminal to light may be determined relatively accurately regardless of a posture of the user based on a quantity of touch regions, so as to avoid a case in which the user needs to manually perform screen switching due to wrong determining. For example, when the user lies on a back of the user, a screen facing the user is in a downward direction. As shown in FIG. 8, only one finger touches a screen in a downward direction, in other words, there is only one touch region. However, four fingers touch a screen in an upward direction, in other words, there are four touch regions.

Figure 9:
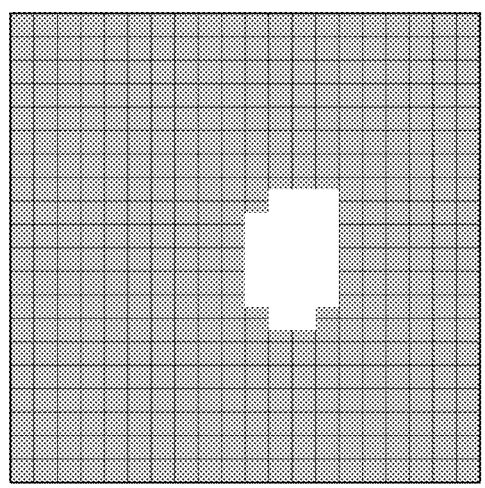
FIG. 9 is a schematic diagram of a channel on a screen.

In some embodiments, because of some special gestures of handholding the terminal by the user, a case in which the quantity of touch regions on the first screen is equal to the quantity of touch regions on the second screen may occur. However, usually, a touch area of a screen facing the user is relatively small, and a touch area of a screen backing to the user is relatively large. However, a size of a touch area of a screen may be indicated by a quantity of channels covered by a touch region. As shown in FIG. 9, the channels are sensing channels set on horizontal and vertical directions of the first screen and the second screen, and are configured to: sense a touch operation of the user, and determine a position of the touch operation of the user. A larger quantity of channels covered by a touch region indicates a larger touch area, and a smaller quantity of channels covered by a touch region indicates a smaller touch area. Based on the foregoing reason, in this embodiment of the present invention, when detecting that the quantity of touch regions on the first screen is equal to the quantity of touch regions on the second screen, the processor in the terminal may further detect a quantity of channels covered by a touch region on the first screen and a quantity of channels covered by a touch region on the second screen; then determine, as the screen that the user expects the terminal to light, a screen on which a touch region covers a smaller quantity of channels; and light the screen.

In addition, the processor in the terminal may further separately calculate an area of the touch region on the first screen and an area of the touch region on the second screen, and light a screen on which a touch region has a smaller area. After detecting the operation performed by the user to trigger lighting of a screen, the processor in the terminal first determines a quantity of touch regions. If the quantity of touch regions on the first screen is different from the quantity of touch regions on the second screen, the processor lights a screen with a smaller quantity of touch regions because a process of determining a quantity of touch regions is relatively simple and fast. If the quantity of touch regions on the first screen is equal to the quantity of touch regions on the second screen, the processor further calculates an area of the first screen and an area of the second screen, and then lights a screen with a smaller touch area.

Figure 10:
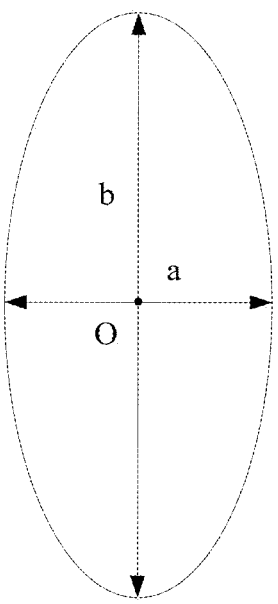
FIG. 10 is a schematic diagram of a major axis and a minor axis that are determined for an oval fitting a touch region.

In some cases, the processor in the terminal may be incapable of obtaining a channel covered by a touch region. In this case, the processor in the terminal may further obtain a length of a major axis of a touch region. The processor in the terminal fits, to an oval, each detected touch region, namely, a region touched by each finger. For example, a touch region shown in FIG. 9 is fitted, and an oval obtained after the fitting is shown in FIG. 10. A center point (O), a length of a major axis (b), and a length of a minor axis (a) of the touch region are determined after the oval obtained after fitting is analyzed. Usually, in order that the terminal accurately detects an operation of the user when the user touches a screen, a touch area is not excessively large, in other words, a length of a major axis is not excessively large. However, because a finger on a screen backing to the user needs to support the terminal, a touch area is usually greater than a touch area on a screen facing the user, in other words, a length of a major axis is relatively large. Therefore, the terminal may light a screen with a smaller length of a major axis of a touch region. If the quantity of touch regions on the first screen or the quantity of the touch regions on the second screen is greater than 1, a maximum value of a length of a major axis of a touch region on the first screen and a maximum value of a length of a major axis of a touch region on the second screen may be first compared, and a screen with a smaller value is lighted.

Figure 11:
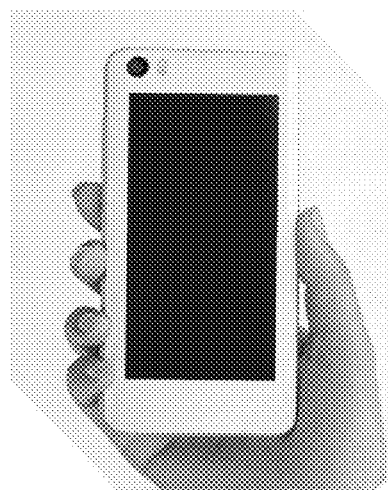
FIG. 11 shows another gesture of handholding a terminal by a user.

When using the terminal, in addition to the gesture shown in FIG. 7, the user may further use a gesture shown in FIG. 11. To be specific, two sides of the terminal are pinched by using a hand, and the hand touches neither the first screen nor the second screen. In the foregoing scenario, the processor in the terminal may further determine a to-be-lighted screen based on a touch status detected by a detector disposed on a side edge of the terminal. For example, the processor in the terminal may determine, based on a pre-stored fingerprint of the user, that the user holds the terminal by using a right hand as shown in FIG. 11. A thumb of the right hand touches a first side edge, and other fingers of the right hand touch a second side edge. In this case, it may be determined to light the first screen of the terminal, namely, a screen located on a front side of the terminal shown in FIG. 11. If it is detected that a thumb of the right hand touches a second side edge, and other fingers of the right hand touch a first side edge, it is determined to light the second screen of the terminal, namely, a screen located on a back side of the terminal shown in FIG. 11.

Certainly, when determining a to-be-lighted screen, the processor in the terminal may further directly determining the to-be-lighted screen based on the quantity of channels covered the touch region on the first screen and the quantity of channels covered by the touch region on the second screen, or based on the area of the touch region on the first screen and the area of the touch region on the second screen, or based on the length of the major axis of the touch region on the first screen and the length of the major axis of the touch region on the second screen.

In some scenarios, the user performs the operation to trigger lighting of a screen, but touches neither the first screen nor the second screen. For example, when the terminal is placed on a table, the user triggers lighting of a screen of the terminal by pressing the Home button.

In the foregoing scenario, a solution is that the processor in the terminal detects that neither the first screen nor the second screen is touched, and the processor in the terminal may determine a screen in an upward direction by using the acceleration sensor or another sensing apparatus, and light the screen in the upward direction. Usually, the screen in the upward direction is a screen that can be observed and used by the user. Therefore, the processor in the terminal may light the screen in the upward direction. In some cases, when the terminal is supported by a holder and becomes nearly vertical, the terminal may be incapable of accurately determining a to-be-lighted screen by using only the acceleration sensor. The terminal may further determine whether there is a contact object on each side of the terminal, and then light a screen on a side on which there is no contact object.

In the foregoing scenario, another solution is as follows: The processor in the terminal detects that neither the first screen nor the second screen is touched, and the processor in the terminal may further enable a first camera and a second camera. The first camera and the first screen are located on a same side of the terminal, and the second camera and the second screen are located on a same side of the terminal. The processor in the terminal determines to light the first screen if the first camera detects a face; or the processor in the terminal determines to light the second screen if the second camera detects a face. It is because a screen on a side that can detect a face, namely, a side facing the user may be usually considered as the screen that the user expects the terminal to light. Optionally, the processor in the terminal may simultaneously enable the first camera and the second camera, and simultaneously analyze an image collected by the first camera and an image collected by the second camera. Alternatively, the processor may enable the cameras in turn. For example, the first camera is first enabled, and an image collected by the first camera is analyzed. It is determined to light the first screen if a face is detected from the image collected by the first camera. If no face is detected from the image collected by the first camera, the second camera is enabled, and an image collected by the second camera is analyzed. Alternatively, only one camera may be enabled. For example, only the first camera is enabled, and the first screen is turned on if a face is detected from an image collected by the first camera; or the second screen is turned on if no face is detected from an image collected by the first camera.

If the terminal is in a scenario in which there is a relatively large quantity of people, both the first camera and the second camera may be capable of detecting a face. Because the terminal is usually relatively close to a user operating the terminal, a distance between the terminal and a person on a side of the terminal may be further determined based on a proximity sensor or by analyzing an image collected by a camera, and a screen on a side on which a person is relatively close to the terminal is lighted. Alternatively, the processor in the terminal may perform face feature recognition on a face image collected by the first camera and a face image collected by the second camera, and match a recognized face feature with a face feature that is of an authorized user of the terminal and that is stored in a memory of the terminal, determine whether the collected face image is a face image of the authorized user of the terminal; and light the first screen if the first camera collects the face image of the authorized user; or light the second screen if the second camera collects the face image of the authorized user.

In addition, the terminal may alternatively select one of the first screen and the second screen, and set a selected screen as a default screen. The processor in the terminal may light the specified default screen when the quantity of touch regions on the first screen is equal to the quantity of touch regions on the second screen, when neither the first screen nor the second screen is touched, when both the first camera and the second camera detect a face, when neither the first camera nor the second camera detects a face, or in another case.

Further, after determining a to-be-lighted screen, the processor in the terminal may further determine, based on gravity acceleration, whether the to-be-lighted screen is in a downward direction. If the screen is in the downward direction, it indicates that the user may lie on a back of the user. In this case, brightness of the screen may be dimmed when the screen is lighted, to further improve user experience.

In the foregoing embodiment of the present invention, when the quantity of touch regions on the first screen is equal to the quantity of touch regions on the second screen, the to-be-lighted screen is further determined based on some or all methods of determining based on an area of a touch region, based on a quantity of channels covered by a touch region, by using the acceleration sensor, or by using a camera. A sequence of determining is not limited.

In addition, for a terminal including two fingerprint unlocking apparatuses, a first fingerprint unlocking apparatus and the first screen are located on a same side of the terminal, and a second fingerprint unlocking apparatus and the second screen are located on a same side of the terminal. The to-be-lighted screen may be further directly determined based on a triggered fingerprint unlocking apparatus. The first screen is lighted when the user triggers the first fingerprint unlocking apparatus; or the second screen is lighted when the user triggers the second fingerprint unlocking apparatus.

Figure 12:
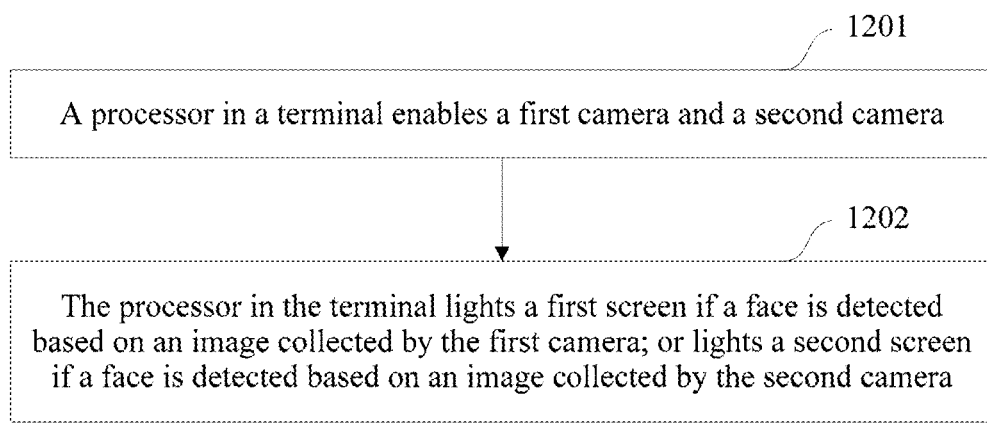
FIG. 12 is another schematic flowchart of a screen lighting method for a dual-screen terminal according to an embodiment of the present invention.

An embodiment of the present invention further provides a screen lighting method for a dual-screen terminal. The method may be applied to a terminal including two independent screens. When a user triggers lighting of the terminal, the terminal automatically determines a to-be-lighted screen. Referring to FIG. 12, FIG. 12 is a schematic flowchart of the method. As shown in the figure, the method includes the following steps.

Step 1201: A processor in the terminal enables a first camera and a second camera.

Specifically, the processor in the terminal may enable the first camera and the second camera after detecting, by using a detector, an operation performed by the user to trigger lighting of a screen. As described above, the operation performed by the user to trigger lighting of a screen may be pressing a power button or pressing a Home button; may be controlled by a voice of the user; or may be an operation such as shaking the terminal. The corresponding detector may be an input device controller, may be an audio frequency circuit, or may be a sensor controller, or the like.

Usually, when the user triggers lighting of a screen of the terminal, the user faces the terminal. When the user faces the terminal, a face of the user can usually be identified by a camera on a side facing the user. Therefore, a camera may be enabled to detect a face. A screen on a side that can detect a face, namely, a side facing the user may be considered as a screen that the user expects the terminal to light.

Step 1202: The processor in the terminal lights a first screen if a face is detected based on an image collected by the first camera; or lights a second screen if a face is detected based on an image collected by the second camera.

In the foregoing embodiment, the to-be-lighted screen is determined by detecting the face by using the camera, to resolve a problem that when the user lies on a back of the user, the to-be-lighted screen cannot be accurately determined by using only an acceleration sensor.

Optionally, the processor in the terminal may simultaneously enable the first camera and the second camera, and simultaneously analyze the image collected by the first camera and the image collected by the second camera. Alternatively, the processor may enable cameras in turn. For example, the first camera is first enabled, and an image collected by the first camera is analyzed. It is determined to light the first screen if a face is detected from the image collected by the first camera. If no face is detected from the image collected by the first camera, the second camera is enabled, and the image collected by the second camera is analyzed. Alternatively, only one camera may be enabled. For example, only the first camera is enabled, and the first screen is turned on if a face is detected from the image collected by the first camera; or the second screen is turned on if no face is detected from an image collected by the first camera.

In some cases, neither the first camera nor the second camera can detect a face. For example, the terminal is placed on a table. The user may want to know only a current time by using the terminal, instead of continuing to perform another operation by using the terminal. In this case, the user may only approach to the terminal to clearly see a time displayed on a screen, and does not face the screen.

When neither the first camera nor the second camera detects a face, it may be considered that a case in which the user lies on the back of the user is excluded. In this case, further determining may be performed in combination with the acceleration sensor. The processor in the terminal may determine a screen in an upward direction by using the acceleration sensor, and then light the screen in the upward direction.

Alternatively, when neither the first camera nor the second camera detects a face, the to-be-lighted screen may be further determined based on a touch status of the first screen and a touch status of the second screen. As described above, the processor in the terminal may determine a quantity of touch regions on the first screen and a quantity of touch regions on the second screen by using a touch control panel of the first screen and a touch control panel of the second screen, and then light a screen with a smaller quantity of touch regions. If the quantity of touch regions on the first screen is equal to the quantity of touch regions on the second screen, determining may be further performed based on a quantity of channels covered a touch region on the first screen and a quantity of channels covered a touch region on the second screen, and a screen on which a touch region covers a smaller quantity of channels is lighted. Alternatively, determining may be further performed based on an area of a touch region on the first screen and an area of a touch region on the second screen, and a screen on which a touch region has a smaller area is lighted. Alternatively, determining may be further determined based on a length of a major axis of an oval that fits a touch region on the first screen and a length of a major axis of an oval that fits a touch region on the second screen, and a screen with a smaller length of a major axis of a touch region is lighted. The foregoing methods may be applied when neither the first camera nor the second camera detects a face, or may be applied when both the first camera and the second camera detect a face.

In addition, the terminal may select one of the first screen and the second screen, and set a selected screen as a default screen. The processor in the terminal may light the specified default screen when neither the first camera nor the second camera detects a face, or when both the first camera and the second camera detect a face, or in another case.

The foregoing technical idea may also be applied to a terminal including two screens but only one camera. When determining the to-be-lighted screen, the processor in the terminal may enable the camera. A screen that is located on a same side as the camera is lighted if a face is detected from an image collected by the camera; or a screen on the other side is lighted if no face is detected from an image collected by the camera. Certainly, if no face is detected from an image collected by the camera, the to-be-lighted screen may be further determined by using the acceleration sensor or based on a touch status of the first screen and a touch status of the second screen.

Figure 13:
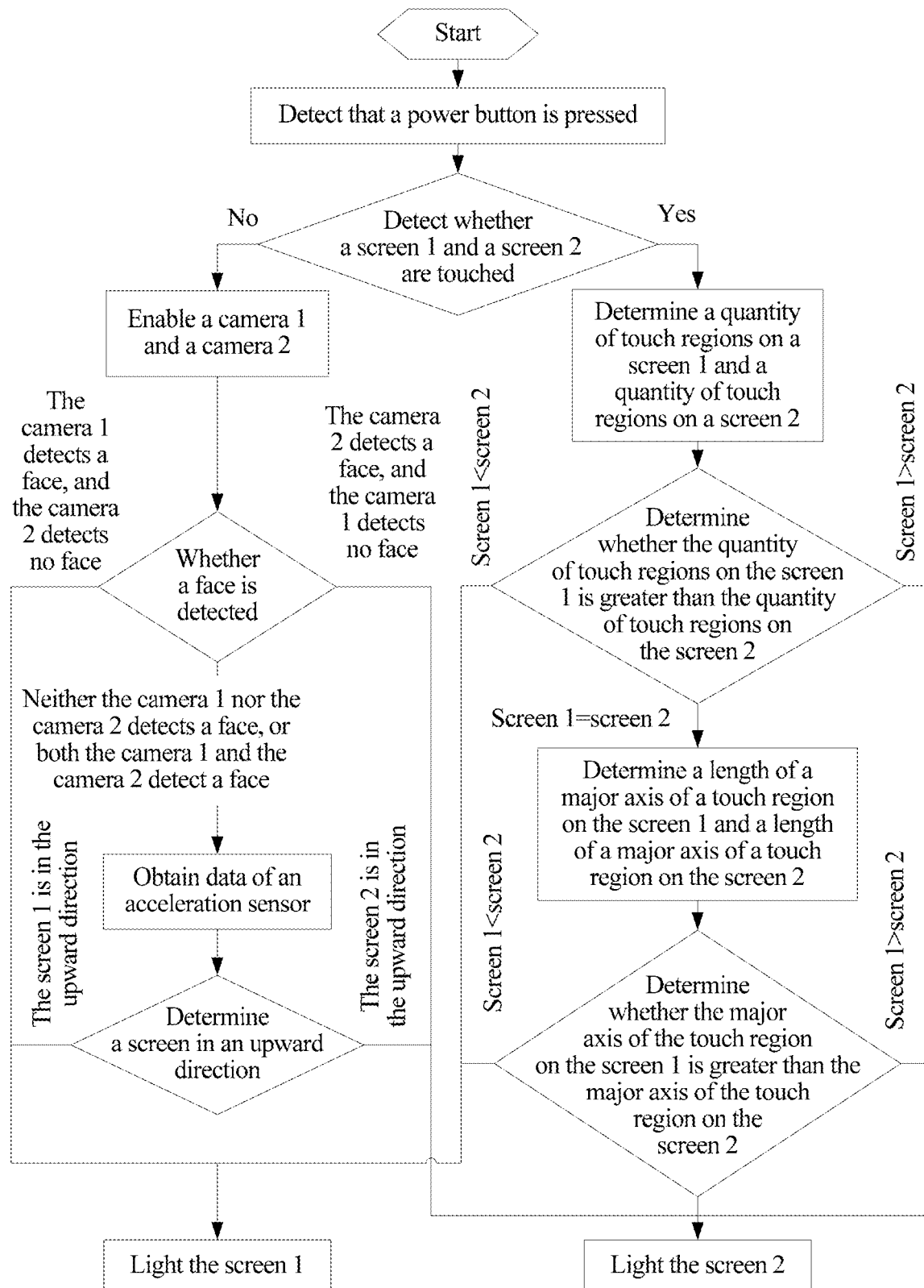
FIG. 13 shows a specific embodiment according to the present invention.

To describe the foregoing embodiment of the present invention more clearly, the following describes a specific embodiment with reference to FIG. 13. A screen 1 and a camera 1 are located on a same side of the terminal, and a screen 2 and a camera 2 are located on a same side of the terminal.

When the user presses the power button, the processor in the terminal detects, by using a touch control panel of the screen 1 and a touch control panel of the screen 2, whether the screen 1 and the screen 2 are touched.

If it is detected that the screen 1 and/or the screen 2 are/is touched, a quantity of touch regions on the screen 1 and a quantity of touch regions on the screen 2 are further determined, and whether the quantity of touch regions on the screen 1 is greater than the quantity of touch regions on the screen 2 is determined. The screen 1 is lighted if the quantity of touch regions on the screen 1 is less than the quantity of touch regions on the screen 2; the screen 2 is lighted if the quantity of touch regions on the screen is greater than the quantity of touch regions on the screen 2; or if the quantity of touch regions on the screen 1 is equal to the quantity of touch regions on the screen 2, a length of a major axis of a touch region on the screen 1 and a length of a major axis of a touch region on the screen 2 are further determined, and whether the length of the major axis of the touch region on the screen 1 is greater than the length of the major axis of the touch region on the screen 2 is determined. The screen 1 is lighted if the length of the major axis of the touch region on the screen 1 is smaller than the length of the major axis of the touch region on the screen 2; or the screen 2 is lighted if the length of the major axis of the touch region on the screen 1 is greater than the length of the major axis of the touch region on the screen 2.

If it is detected that neither the screen 1 nor the screen 2 is touched, the processor in the terminal controls enabling of the camera 1 and the camera 2, and detects whether the camera 1 and the camera 2 collect a face image. The screen 1 is lighted if the camera 1 collects a face image and the camera 2 collects no face image; or the screen 2 is lighted if the camera 2 collects a face image and the camera 2 collects no face image. If neither the camera 1 nor the camera 2 collects a face image, or both the camera 1 and the camera 2 collect a face image, the processor in the terminal further obtains data of the acceleration sensor, determines a screen in an upward direction; and lights the screen 1 if the screen 1 is in the upward direction; or lights the screen 2 if the screen 2 is in the upward direction.

An embodiment of the present invention further provides a method for turning off a screen. The method may be applied to a terminal including a foldable screen shown in FIG. 14. When the screen is unfolded, the screen is relatively large. When the screen is folded, the screen becomes two relatively small screens, and the two screens may be respectively referred to as a first screen and a second screen. When a user folds the screen, it may be considered that the user uses only one screen in this case. To reduce power consumption of the terminal, the terminal may automatically turn off one screen based on the method.

Specifically, after detecting, by using a detector, that the foldable screen is folded, a processor in the terminal detects a quantity of touch regions on the first screen and a quantity of touch regions on the second screen, and turns off a screen with a larger quantity of touch regions. As described above, the user usually uses a relatively small quantity of fingers to touch and control a screen facing the user, and places a relatively large quantity of fingers on a side backing to the user to support the terminal. Therefore, when the terminal is folded, the screen with the larger quantity of touch regions, namely, the screen backing to the user may be turned off to save power.

Further, when the quantity of touch regions on the first screen is equal to the quantity of touch regions on the second screen, the processor in the terminal may further detect a quantity of channels covered by a touch region on the first screen and a quantity of channels covered by a touch region on the second screen, and turn off a screen on which a touch region covers a larger quantity of channels. Alternatively, the processor in the terminal may detect a length of a major axis of a touch region on the first screen and a length of a major axis of a touch region on the second screen, and turn off a screen with a larger length of a major axis of a touch region. Alternatively, the processor in the terminal may detect an area of a touch region on the first screen and an area of a touch region on the second screen, and turn off a screen on which a touch region has a smaller area.

Figure 1:
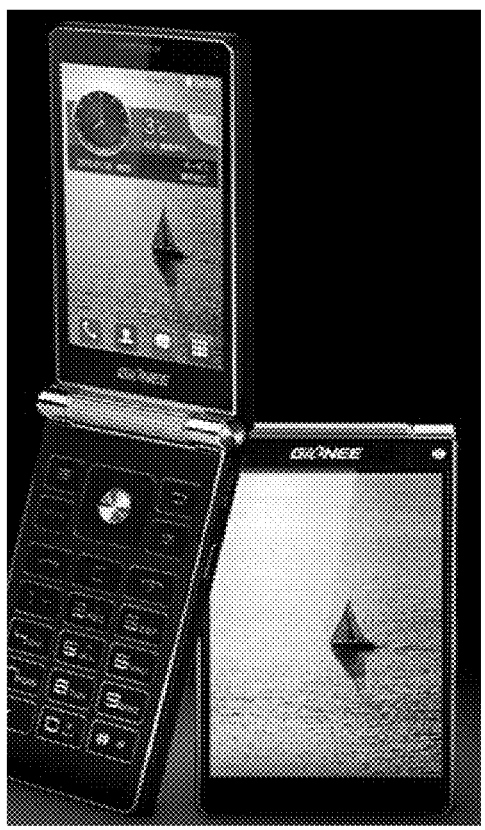
FIG. 1 shows a clamshell dual-screen mobile phone.
Figure 2:
FIG. 2 shows a bar dual-screen mobile phone.
Figure 3:
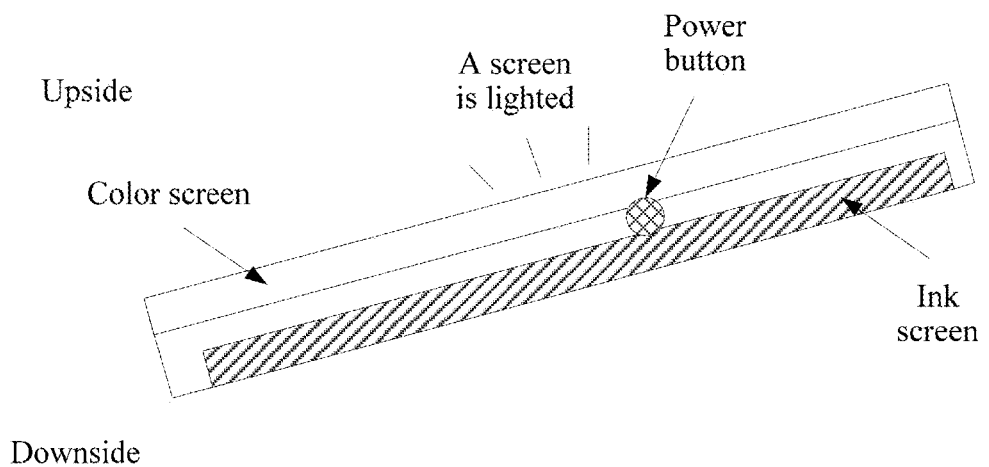
FIG. 3 is a schematic diagram of using an acceleration sensor to determine to light a color screen.
Figure 4:
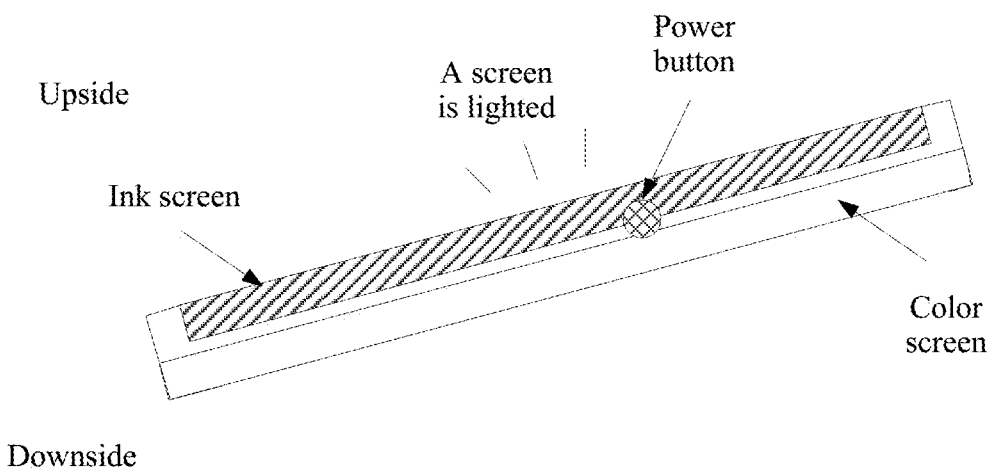
FIG. 4 is a schematic diagram of using an acceleration sensor to determine to light an ink screen.
Figure 14:
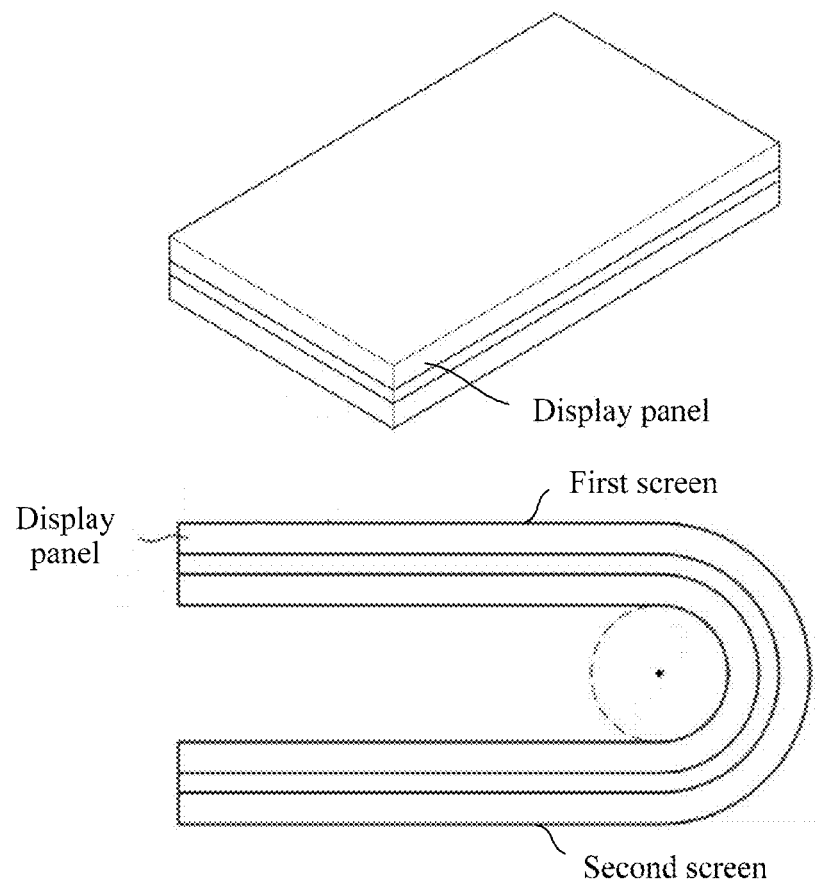
FIG. 14 is a schematic structural diagram of a terminal including a foldable screen.
Figure 15:
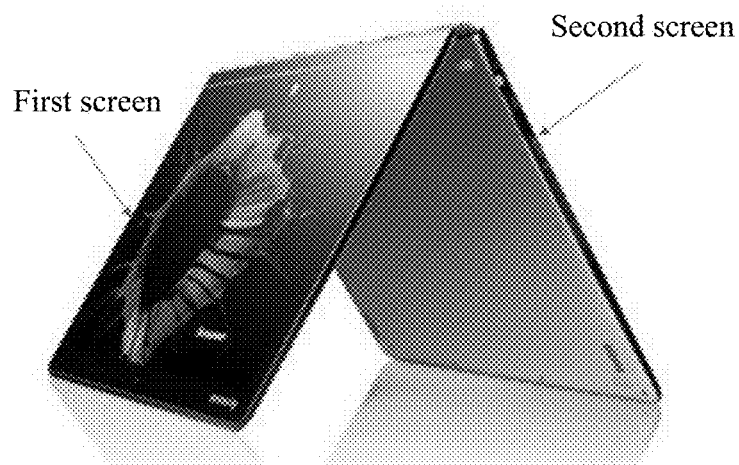
FIG. 15 is a schematic diagram of a dual-screen terminal that may be applied to an embodiment of the present invention.

The foregoing screen lighting method embodiment and the foregoing method embodiment for turning off a screen may be applied to a terminal including two screens that is not limited to the terminals shown in FIG. 2 and FIG. 14, or may be applied to a dual-screen terminal shown in FIG. 15. This is not limited in the embodiments of the present invention.

Based on a same technical idea, an embodiment of the present invention further provides a dual-screen terminal, to implement the foregoing method embodiments. A schematic structural diagram of the terminal provided in this embodiment of the present invention may be shown in FIG. 5, but is not limited to the terminal shown in FIG. 5. The terminal includes: a first screen, a second screen, a processor, and a memory and a detector that are separately connected to the processor.

The processor is configured to invoke a computer program prestored in the memory, to perform the following operations:

detecting a quantity of touch regions on the first screen and a quantity of touch regions on the second screen by using the detector; and lighting a screen with a smaller quantity of touch regions if the quantity of touch regions on the first screen is different from the quantity of touch regions on the second screen.

Optionally, sensing channels are disposed on both horizontal and vertical directions of the first screen and the second screen, and the processor is further configured to: if the quantity of touch regions on the first screen is equal to the quantity of touch regions on the second screen, detect, by using the detector, a quantity of channels covered by a touch region on the first screen and a quantity of channels covered by a touch region on the second screen; and light a screen on which a touch region covers a smaller quantity of channels.

Optionally, the processor is further configured to: detect, by using the detector, a length of a major axis of a touch region on the first screen and a length of a major axis of a touch region on the second screen if the quantity of touch regions on the first screen is equal to the quantity of touch regions on the second screen; and light a screen with a smaller length of a major axis of a touch region is smaller.

Optionally, the processor is further configured to: determine a screen in an upward direction if neither the first screen nor the second screen is touched; and light the screen in the upward direction.

Optionally, the processor is further configured to: enable a first camera and a second camera if neither the first screen nor the second screen is touched, where the first camera and the first screen are located on a same side of the terminal, and the second camera and the second screen are located on a same side of the terminal; and light the first screen if the first camera detects a face; or light the second screen if the second camera detects a face.

Based on a same technical idea, an embodiment of the present invention further provides a dual-screen terminal, to implement the foregoing method embodiments. A schematic structural diagram of the terminal provided in this embodiment of the present invention may be shown in FIG. 5, but is not limited to the terminal shown in FIG. 5. The terminal includes: a first screen, a second screen, a first camera, a second camera, a processor, and a memory connected to the processor. The first camera and the first screen are located on a same side of the terminal, and the second camera and the second screen are located on a same side of the terminal.

The processor is configured to invoke a computer program prestored in the memory, to perform the following operations:
enabling the first camera and the second camera; and lighting the first screen if the first camera detects a face; or lighting the second screen if the second camera detects a face.

Optionally, if neither the first camera nor the second camera detects a face, the processor is further configured to: determine a screen in an upward direction; and light the screen in the upward direction.

Optionally, if neither the first camera nor the second camera detects a face, or both the first camera and the second camera detect a face, the processor is further configured to: detect a touch status of the first screen and a touch status of the second screen; and determine, based on the detected touch statuses, whether to light the first screen or the second screen.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn of the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the protection scope defined by the following claims and their equivalent technologies.

What is claimed is:

1. A screen lighting method for a dual-screen terminal, comprising:
   detecting a quantity of touch regions on a first screen of the terminal and a quantity of touch regions on a second screen of the terminal; and
   lighting, by the terminal, a screen with a smaller quantity of touch regions if the quantity of touch regions on the first screen is different from the quantity of touch regions on the second screen.

2. The method according to claim 1, wherein sensing channels are disposed in both horizontal and vertical directions of the first screen and the second screen, and the method further comprises:
   if the quantity of touch regions on the first screen is equal to the quantity of touch regions on the second screen, detecting, by the terminal, a quantity of channels covered by a touch region on the first screen and a quantity of channels covered by a touch region on the second screen; and
   lighting, by the terminal, a screen on which a touch region covers a smaller quantity of channels.

3. The method according to claim 1, further comprising:
   detecting, by the terminal, a length of a major axis of a touch region on the first screen and a length of a major axis of a touch region on the second screen if the quantity of touch regions on the first screen is equal to the quantity of touch regions on the second screen; and
   lighting, by the terminal, a screen with a smaller length of a major axis of a touch region.

4. The method according to claim 1, further comprising:
   determining, by the terminal, a screen in an upward direction if neither the first screen nor the second screen is touched; and
   lighting, by the terminal, the screen in the upward direction.

5. The method according to claim 1, further comprising:
   enabling, by the terminal, a first camera and a second camera if neither the first screen nor the second screen is touched, wherein the first camera and the first screen are located on a same side of the terminal, and the second camera and the second screen are located on a same side of the terminal; and
   lighting, by the terminal, the first screen if the first camera detects a face; or
   lighting, by the terminal, the second screen if the second camera detects a face.

6. A dual-screen terminal, comprising: a first screen, a second screen, a processor, and a memory and a detector that are separately connected to the processor, wherein
   the processor is configured to invoke a computer program prestored in the memory, to perform the following operations:
   detecting a quantity of touch regions on the first screen and a quantity of touch regions on the second screen by using the detector; and
   lighting a screen with a smaller quantity of touch regions if the quantity of touch regions on the first screen is different from the quantity of touch regions on the second screen.

7. The terminal according to claim 6, wherein sensing channels are disposed in both horizontal and vertical directions of the first screen and the second screen, and the processor is further configured to:

if the quantity of touch regions on the first screen is equal to the quantity of touch regions on the second screen, detect, by using the detector, a quantity of channels covered by a touch region on the first screen and a quantity of channels covered by a touch region on the second screen; and light a screen on which a touch region covers a smaller quantity of channels.

8. The terminal according to claim 6, wherein the processor is further configured to:

detect, by using the detector, a length of a major axis of a touch region on the first screen and a length of a major axis of a touch region on the second screen if the quantity of touch regions on the first screen is equal to the quantity of touch regions on the second screen; and light a screen with a smaller length of a major axis of a touch region.

9. The terminal according to claim 6, wherein the processor is further configured to:

determine a screen in an upward direction if neither the first screen nor the second screen is touched; and light the screen in the upward direction.

10. The terminal according to claim 6, wherein the processor is further configured to:

enable a first camera and a second camera if neither the first screen nor the second screen is touched, wherein the first camera and the first screen are located on a same side of the terminal, and the second camera and the second screen are located on a same side of the terminal; and light the first screen if the first camera detects a face; or light the second screen if the second camera detects a face.

\* \* \* \* \*